INVENTOR.
BOYD T. LARROWE
BY
ATTORNEY

INVENTOR.
BOYD T. LARROWE
BY
Stanley D. Schlosser
ATTORNEY

INVENTOR.
BOYD T. LARROWE
BY
Stanley D. Schlosser
ATTORNEY

*Fig. 8a.*

United States Patent Office 3,320,409
Patented May 16, 1967

3,320,409
ELECTRONIC PLOTTING DEVICE
Boyd T. Larrowe, Ypsilanti, Mich., assignor to Burroughs Corporation, Detroit, Mich., a corporation of Michigan
Filed Jan. 30, 1963, Ser. No. 254,909
26 Claims. (Cl. 235—151)

The present invention relates in general to the generation and visual display of electrical signals and more particularly concerns a device for driving any X–Y or two-dimensional plotting device to produce a straight line between two precisely located points on the plotting surface.

With the development of digital computers the need has arisen for a system which will present in a suitable form the output of these computers. A suitable display system must perform with reliability, economy, and speed as well as be compatible with the data generating system itself. Such display requirements suggest the use of a visual presentation for the output of a computer because advances in the photographic art permit a continuous record of the display to be made. Accordingly, the invention is particularly suited for use with a cathode ray tube or a device containing a moving pen or similar drawing element. The invention may be used for other applications than the visual presentation of the output of a digital computer such as the control of the movement of a machine or tool element.

Accordingly, one of the objects of the invention is to provide a system for developing an output for plotting a line or controlling the movement of an element in accordance with the output of a digital computer or similar device.

Another object of the invention is to provide a system for producing straight line movement of an element between two precisely located points in space in accordance with the information supplied by a digital computer, the movement occuring at a rate determined by a transfer waveform.

Another object of the invention is to provide a plotting system which produces a straight line between two precisely located points on a plotting surface, the line being drawn by a single point moving at a rate which is determined by a transfer waveform.

A further object of the invention is to provide a system for providing movement in a straight line also having a control circuit so that movement occurs at a constant rate regardless of the distance over which the movement is to take place.

A still further object of the invention is to provide a digital-to-analog converter whereby digital numbers may be converted to analog voltages of either the sum or difference of the digital numbers by the impression of a transfer waveform upon the registers storing these numbers.

Briefly, in accordance with the present invention there is provided four digital-to-analog converters each containing a register for storing the coordinates or addresses of the initial and terminal points of the straight line which is to be traced or drawn. Two of the registers store the X coordinates of the end points of the line and the other two registers store the Y coordinates of the end points of the line. The two coordinates of each end point comprise the digital address of that end point. A transfer waveform which is a linear ramp voltage increasing from zero to a reference level is applied to the converters containing the registers which store the coordinates of the terminal point of the line. During the same time period, a transfer waveform which is the complement of the linear ramp (varying linearly from the reference level to zero) is impressed on the converters in which the coordinates of the initial point of the line are stored. The digital-to-analog converter storing the X coordinate of the initial point produces an analog of the X coordinate when the complementary ramp is applied to its input. This analog voltage decreases linearly from its initial value to zero because the voltage input to the digital-to-analog converter is the complementary ramp which decreases from the reference level to zero. During the same time period, the digital-to-analog converter which has stored the X coordinate of the terminal address has the ramp waveform impressed on its input. The output of this converter increases linearly from zero to an analog value of the X coordinate of the terminal address. These analog voltages are instantaneosuly summed during the ramp generating time in an appropriate circuit, the summed voltage being the voltage applied to the X deflection electrode of a plotting device. This output voltage produces a linear transfer along the X axis of the moving spot which draws the straight line. The digital-to-analog converters storing the Y coordinates of the initial and terminal digital addresses of the line produce a summed output analog voltage in an identical manner as discussed above. This analog voltage produces a linear transfer along the Y axis of the moving spot. The line which is drawn is the result of a linear transfer along both the X and Y axes, and is a straight line. The invention also provides a means for measuring the rate at which the line is drawn and to control the drawing rate so that it is constant regardless of the length of the drawn line.

In a preferred embodiment, a novel system is used to produce a constant writing rate. This system measures the length of the line to be traced and produces a voltage which has a magnitude inversely proportional to the length. This voltage is applied to a current generator to produce a charging current. This current is applied to a capacitor, the voltage across the capacitor being the ramp waveform which is applied to the digital-to-analog converter. The time in which the line is drawn is directly proportional to the time which is required for the ramp voltage to increase from zero to the reference level. If the capacitor is charged more slowly, i.e., by a smaller charging current, the ramp generating time will be extended and vice versa. Since the charging current is inversely proportional to line length, the amount of charging current controls the writing rate to make it constant.

Other advantages and objects of the present invention will become apparent from the following specification when taken in connection with the accompanying drawing in which:

FIGS. 5(a-e) show a family of curves illustrating the potential waveforms required to produce a pattern of contiguous straight lines on the plotting device of FIG. 1.

FIG. 5c shows the time sequence of unblanking pulses which are applied to the unblanking electrode of the plotting device in order to produce the pattern of FIG. 5a.

FIG. 5d shows the deflection voltages in relation to time which are applied to the Y deflection electrode to produce the pattern of FIG. 5a.

FIG. 5e shows the deflection voltages in relation to time which are applied to the X deflection electrode to produce the pattern of FIG. 5a.

Figure 1:
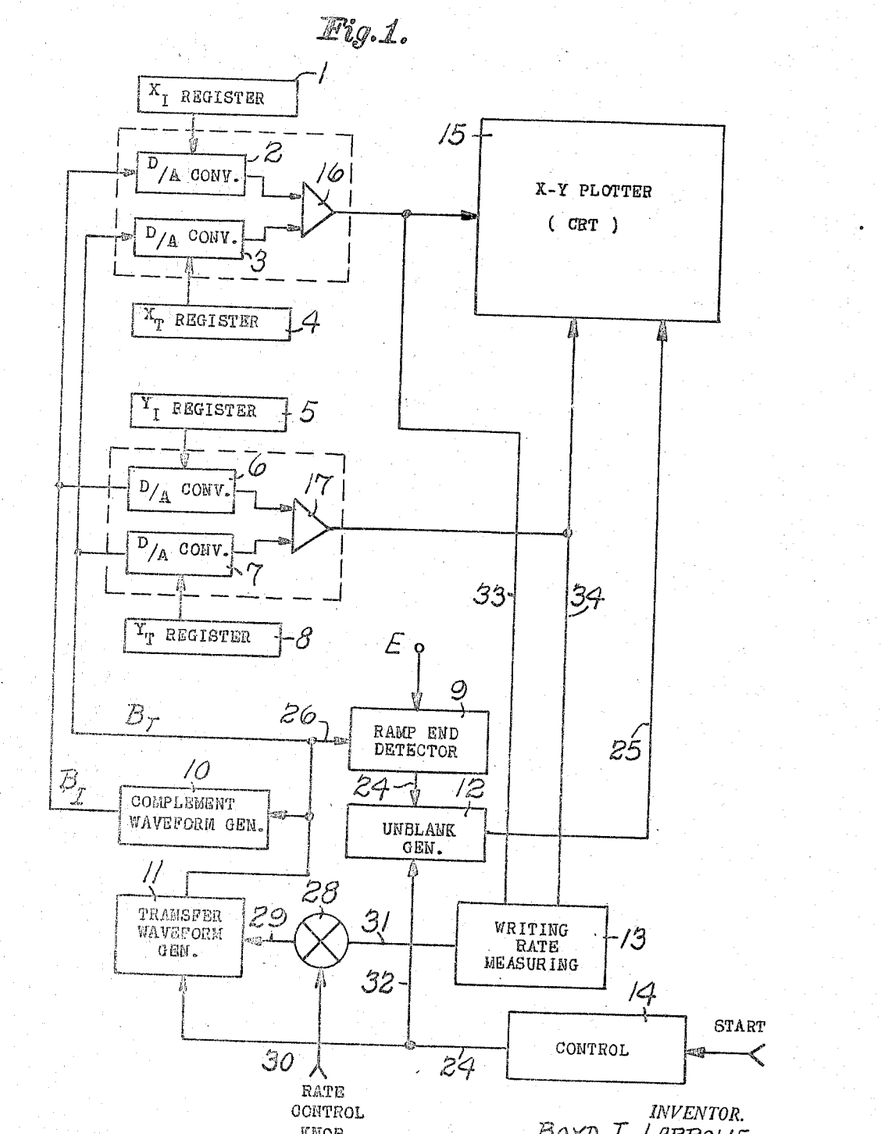
FIG. 1 is a block schematic diagram of a line generator constructed in accordance with the principles of the invention.

Referring to the drawings and particularly to FIG. 1 thereof, the line generator constituting the present invention consists of four digital-to-analog converters 2, 3, 6, and 7 containing digital registers 1, 4, 5, and 8 respectively, a transfer waveform generator 11, a complement generator 10, a first summing amplifier 16, a second summing amplifier 17, a cathode ray tube 15, and various control circuitry which will be later explained.

Digital register 1 stores the X coordinate of the initial point of the line which is to be drawn on the face of cathode ray tube 15. Hence, the register is designated the $X_I$ register. Similarly, register 4 stores the X coordinate of the terminal point of the line and is designated the $X_T$ register. Register 5 stores the Y coordinate of the initial point of the line to be drawn and register 8 stores the Y coordinate of its terminal point and are accordingly designated. The coordinates may be stored in any desired digital number system such as binary, binary coded decimal, ten-line decimal, etc. The digital information stored in register 1 and also in the three other registers is supplied by a digital computer or similar apparatus to the digital input of the converters.

If it were desired to produce linear motion or to draw a line in any multi-dimensional space, the method employed by the present invention could be extended by merely increasing the number of storage registers. Necessarily the number of digital-to-analog converters would be increased to correspond to the number of storage registers. Also, various other circuit elements would be increased as will become obvious as the two-dimensional plotting system is explained.

A digital-to-analog converter is a device which converts a quantity represented by a set of binary digits into an analog quantity varying in amplitude as a function of the magnitude of the binary number. In the present invention, the analog quantities are electrical voltages which are used as deflection potentials to cause the desired movement. These potentials move the beam of the cathode ray tube from the point designated by the digital address of the initial position to the point designated by the digital address of the terminal position. Converter 2 converts the digital number stored in register 1 to an analog of the digital number. Converter 3 converts the binary coded digital number stored in register 4 to its analog. Also, the digital numbers of registers 5 and 8 are converted to analog voltages by converters 6 and 7 respectively.

The converters may be conventional ladder type digital-to-analog converters which are constant impedance devices. Thus, the outputs of two converters may be summed by connecting their outputs across a common load resistance.

The outputs of converters 2 and 3 are combined in a summing amplifier 16 while the outputs of converters 6 and 7 are combined in a summing amplifier 17. The output of amplifier 16 is connected to the X deflection electrode of cathode ray tube 15 and the output of amplifier 17 is connected to the Y deflection electrode of tube 15. The simultaneous application of positive or negative going voltages to the X and Y deflecting electrodes of the tube 15 causes the beam to follow any desired path.

Figure 2A:
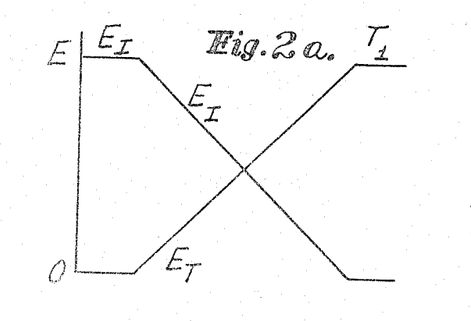
FIG. 2a is a graph illustrating the ramp voltage waveforms which are generated by the transfer waveform generator and by the complement waveform generator and impressed upon the digital-to-analog converters illustrated in block form in FIG. 1.

The operation of transfer wave generator 11 and complement waveform generator 10 can best be understood by reference to FIG. 2a. The output of generator 11 is applied to the inputs of converters 3 and 7 by bus $B_T$. The output of generator 11 is also connected to the input of complement generator 10. The output of generator 10 is connected by bus $B_I$ to the inputs of converters 2 and 6. The graph of FIG. 2a shows the output $E_T$ of generator 11. This voltage waveform is a linear ramp which rises from zero to reference level E during time T. This ramp waveform $E_T$ is also simultaneously impressed upon the input terminal of complement generator 10 which generates a ramp waveform $E_I$, which is also shown in FIG. 2a. It is important to note that the voltage $E_I$ and $E_T$ are exact complements of each other. Expressed mathematically, $$E_I = E\left(1 - \frac{t}{T}\right) \text{ and } E_T = E\left(\frac{t}{T}\right)$$

where T is the time during which the ramp is generated, and $t$ is the length of time which has elapsed since the generation period of the ramp began. Time T is also the period in which the line is drawn between its end points.

Converter 2, containing the $X_I$ register, produces an output voltage E whereby $$E = \frac{E_I}{K}(X_I)$$

$X_I$ being the X coordinate of the digital address of the initial point of the line, and K being a constant determined by the parameters of the circuit. The $X_T$ register similarly produces an output $$E = \frac{E_T}{K}(X_T)$$

Starting at time $T_0$, the reference voltage $E_I$ on bus $B_I$ is decreased linearly to zero. During the same time, the reference voltage on bus $B_T$ is increased from zero to E. As the output of waveform $E_I$ is varied from reference level E to zero, output E of converter 2 varies linearly from the analog of the stored quantity to zero. At time $T_I$, converter 2 has a zero output and $X_T$ has an output $$E = \frac{E_T}{K}(X_T)$$

where ($X_T$) is the X coordinate of the digital address of the terminal point. This voltage is the analog of the X coordinate of the digital address of the terminal point of the straight line. During the switching time T, if the two transfer waveforms are exact complements, $$E_I = E\left(1 - \frac{t}{T}\right) \text{ and } E_T = E\left(\frac{t}{T}\right)$$

By substitution and summation, the output voltage $E_o$ of the summing device 16 during switching time T is:

$$E_o = \frac{EX_I}{K}\left(1-\frac{t}{T}\right) + \frac{EX_T}{K}\left(\frac{t}{T}\right)$$

which simplifies to $$E_o = \frac{E}{K}\left(X_I + [X_T - X_I]\frac{t}{T}\right)$$

which is the equation for a linear transfer along the X axis from $X_I$ to $X_T$ in time T.

Figure 2B:
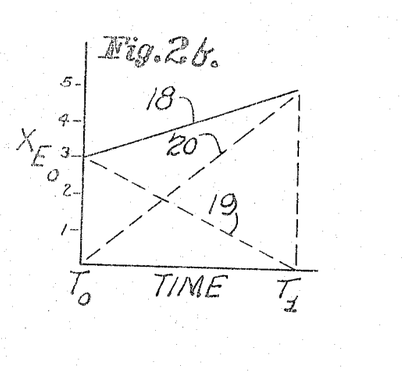
FIG. 2b is a graphical representation of the deflection along the X axis of the moving point due to the voltage applied to the X deflection electrode of the plotting device. Also shown are the two voltages comprising the outputs of the two digital-to-analog converters which are summed to produce this deflection.

Referring now to FIG. 2b, the voltage waveforms which constitute the outputs of converters 2 and 3 and when summed cause the displacement of the moving beam or point are illustrated. The ordinate of this graph shows the displacement of the plotting point along its X axis. The ordinate is designated $X_{E_o}$ as this displacement is produced by the summed output voltage $E_o$ applied to the X deflection electrode. In the discussion of this figure it is assumed that, in the line to be drawn, the initial point has an X coordinate of 3 and the terminal point has an X coordinate of 5. This is illustrated as line 18 which shows that during the tracing of the line, the X position of the plotting point moves at a uniform rate of travel between these two X values. Prior to the beginning of the trace (prior to $T_o$), register 1 has been set to store the decimal number 3 in digital form and register 4 has been set to store the decimal number 5 in digital form. The output of converter 2 is shown as line 19 of FIG. 2b while the output of converter 3 is shown as line 20. During the period T the output of converter 2 decreases linearly from a value of 3, when $E_I$ is at the reference level, to a value of zero when $E_I$ is at a zero value. During the same time period T, the output of converter 3 increases from a value of zero to a value of 5. Line 18 is the summed voltage from the two converters and shows that the beam draws a line with an X displacement varying linearly from $X=3$ to $X=5$. Line 18 is always a straight line defined by the end points of lines 19 and 20 if voltages $E_I$ and $E_T$, and consequently lines 19 and 20, are linear and of the same duration.

Figure 2C:
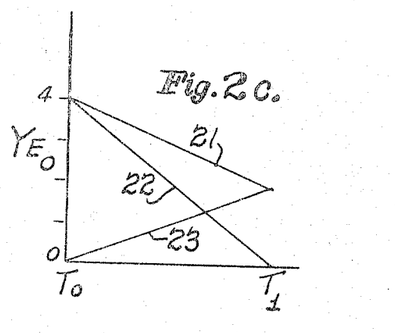
FIG. 2c is a graphical representation of the deflection along the Y axis of the moving point due to the voltage applied to the Y deflection plate of the plotting device. Also shown are the two voltages comprising the outputs of the two digital-to-analog converters which are summed to produce this deflection.

An identical circuit comprising registers 5 and 8, digital-to-analog converters 6 and 7, and summing amplifier 17 is used to generate the output voltage which causes the deflection of the plotting point in the Y direction. The Y deflection voltage $Y_{E_o}$ is illustrated at FIG. 2c. Displacement along the Y axis is shown as line 21 which is produced by output voltages 22 and 23 from converters 6 and 7 respectively. The Y displacement is obtained in the identical manner as the X displacement.

It is apparent that the outputs of the two summing amplifiers will cause a line to be drawn from a position having the coordinates $X=3$, $Y=4$ to a position having coordinates $X=5$, $Y=2$.

Referring again to FIG. 1, the operation of the device begins upon the receipt by the four registers in digital form of the coordinates of the first line to be drawn. When this information has been stored in the registers, a signal pulse is sent from the registers to control device 14. The circuitry associated with this signal pulse generation has not been illustrated but is of conventional design. Upon receipt of this pulse, the control unit 14 produces an initiating pulse of short duration which is transmitted along conductor 24 to transfer waveform generator 11. When the initiating pulse has been received by generator 11, the generation of the transfer waveform is begun as is the generation of the complementary waveform.

The initiating pulse is simultaneously transmitted along conductor 32 to unblank generator 12 of conventional design. Generator 12 has its output conductor 25 connected to the unblanking electrode or control grid of plotting device 15. It is well known that the intensity of the electron beam of a cathode ray tube may be controlled by varying the bias voltage applied to its unblanking electrode. When the grid bias is adjusted so that the electron beam causes the fluorescent screen of the tube 15 to emit visible light, the beam is referred to as unblanked. When the grid bias is adjusted so that the electron beam does not cause visible light to be emitted from the fluorescent face of the tube, the tube is referred to as blanked. Upon receipt of the initiating pulse, generator 12 impresses an unblanking or Z pulse upon the unblanking electrode of tube 15 through conductor 25. This unblanking pulse causes the voltages impressed upon the deflection electrodes of tube 15 from summing amplifiers 16 and 17 to produce a visible trace.

The ramp end detector 9 is a circuit which compares its input to a reference level E and emits an output pulse upon the input of a voltage equal to the reference level. Input lead 26 is connected to bus $B_T$ and accordingly has the ramp waveform output of generator 11 impressed thereupon. When the ramp voltage reaches the value E, detector 9 produces an output pulse on conductor 24. This output pulse causes the unblanking pulse to terminate and tube 15 is blanked. The commencement of the blanking period coincides with the termination of the line tracing period.

During the period when the tube is blanked, following the tracing of the line, the system may be prepared to trace succeeding, contiguous lines. In order to accomplish this, the terminal registers must receive the terminal coordinates of the next line. The terminal registers may be set in any conventional manner to store this information. The terminal point of the preceding line forms the initial point of the succeeding line so that the information that was stored in the terminal registers must now be stored in the initial registers. One method of accomplishing this is the "return to zero" method. In this method all the registers are first returned to the zero state and reset. This is done by supplying the terminal coordinates of the line to be traced to the terminal registers and by placing in the initial registers the information that had previously been in the terminal registers. This method is, of course, relatively time consuming as it requires both a resetting of the registers to zero and a subsequent resetting of all of the registers to a new digital value. In the transfer method, to be discussed in greater detail in connection with the preferred embodiment of the invention, the digital information set in the terminal registers is transferred to the initial registers through gating circuitry and the terminal registers are reset to a new value.

Upon the resetting of the registers, a signal pulse is sent to control unit 14 from the registers to initiate the tracing of the next contiguous straight line segment. The initiating pulse from the output control unit 14 causes generator 11 to generator another ramp waveform and, of course, causes complement generator 10 to generate the complement waveform. During the blanking period the output voltage of generator 11 is returned to zero and ramp end detector 9 no longer produces a pulse on lead 24.

Figure 5A:
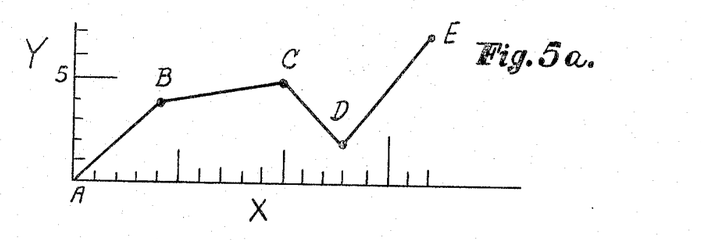
FIG. 5a shows the pattern to be drawn on the plotting device.

Referring now to FIG. 5, the various waveforms which are necessary to trace a succession of contiguous straight lines are illustrated in connection with an example. At FIG. 5a is shown the pattern which is to be traced. The pattern consists of four lines AB, BC, CD, and DE which are of various slopes and lengths. Assigning the initial point A of the line AB the coordinates O, O; the addresses of the end points of the lines are as follows:

|   | X | Y |
|---|---|---|
| A | 0 | 0 |
| B | 4 | 4 |
| C | 10 | 5 |
| D | 13 | 2 |
| E | 17 | 7 |

Figure 5B:
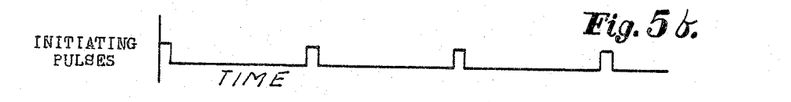
FIG. 5b shows the time sequence of initiating pulses which cause the drawing of each individual line to commence.
Figure 5C:
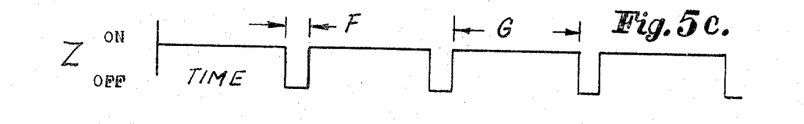

FIG. 5c illustrates by means of a graph the time sequence during which the cathode ray tube 15 is successively blanked and unblanked. The unblanking pulses are of time duration G, interrupted by blanking periods F. The beam of tube 15 only draws the lines of FIG. 5a during the unblanking periods, the blanking periods being used to reset the registers between the termination of one line and the commencement of the succeeding line. Also, during blanking periods F the generators 10 and 11 are returned to outputs $E_I$ and $E_T$ respectively. Shown at FIG. 5b are the initiating pulses generated by control unit 14 which are transmitted along conductors 24 and 32 to generators 11 and 12.

Figure 5D:
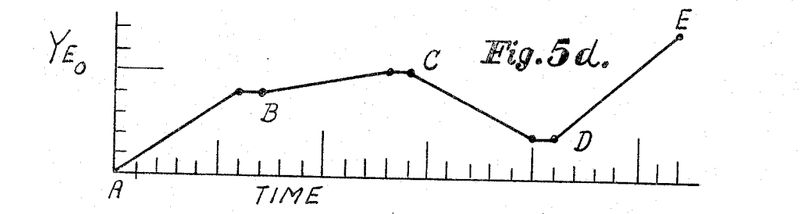

FIG. 5d shows the displacement along the Y axis of the moving spot causing the four lines to be sequentially drawn. It can be seen that during the time period G for the drawing of line AB, the voltage on the Y electrode has changed linearly to cause a Y displacement of the moving point from 0 to 4. During time periods F, between line traces, the deflection voltage applied to the Y electrode is not varied.

Figure 5E:
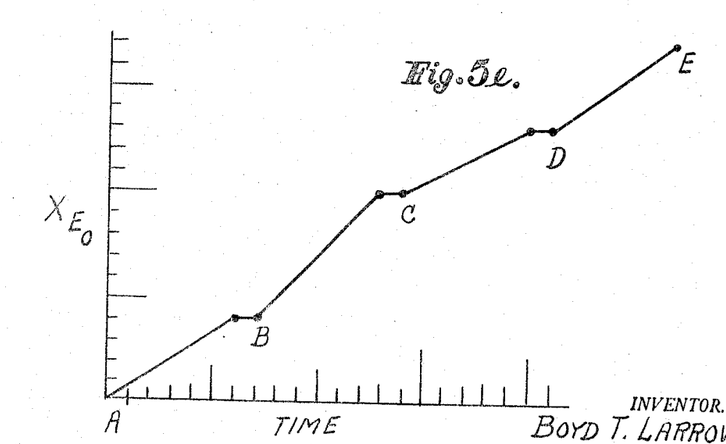

FIG. 5e shows the displacement along the X axis of the moving spot causing the lines of FIG. 5a to be drawn. It is seen that during the drawing of line AB, the deflection voltage on the X axis has changed linearly to cause a displacement on this axis from 0 to 4. Also, during period F, the deflection voltage applied to the X axis is not varied.

To trace line BC, the point is displaced linearly from a value $X=4$ to a value $X=10$. During the same time, the point is displaced linearly from $Y=4$ to $Y=5$ and line BC is traced. Upon the completion of this line, the tube is blanked until another initiating pulse is generated and the cycle continues.

In the system described above, the straight line is traced between any two addresses in a constant period of time. This is clearly shown at FIG. 5c where it is seen that the time periods G during which the various lines are drawn are equal in duration. Thus, while line CD is shorter in length than line DE, it is traced in the same time as DE. The apparent intensity of a cathode ray tube display is inversely proportional to the writing rate and the writing rate achieved is directly proportional to the line length. Thus, short lines will appear bright and long lines will appear dim. This deficiency could be overcome if the line generator were made to produce a line at a constant writing rate $$K=\frac{S}{T}$$

where K is the writing rate, T is the writing time, and S is the line length.

Since the line is drawn during the time T in which the transfer waveform is generated, this transfer waveform must be completed in time $$T=\frac{S}{K}$$

to produce a constant writing rate. The circuit controlling the transfer waveform generation time is illustrated in FIG. 1 and comprises write rate measuring circuit 13 and writing rate control element 28. Upon commencement of operation, the waveform generator 11 starts to produce a ramp with maximum slope. This ramp causes X and Y deflection voltages which are also transmitted to writing rate measuring circuit 13 over conductors 33 and 34 to produce a voltage $$S^o=\sqrt{(E_x)^2+(E_y)^2}$$

where $S^o$ is proportional to the length of the drawn line.

Element 28 is a writing rate control device producing an output on conductor 29 which controls the generation time of the transfer waveform. Preset into device 28 by the adjustment of rate control knob 30 is a predetermined writing rate K. The output $S^o$ of circuit 13 is applied to the input of element 28 via lead 31. This voltage $S^o$ is compared by device 28 with a voltage representing the desired rate K and produces a rate control output signal which is applied to generator 11 through lead 29. This rate control signal is used to adjust generator 11 until $S^o=K$, thus producing a constant rate system.

Referring again to FIG. 5, it is seen that the graphs illustrate the waveforms employed in the device operating without the writing rate control circuitry described above. When the writing rate is held constant, the unblanking pulses 2 would be of varying duration, their duration being proportional to the length of the line traced during their duration. The duration of the time periods F may or may not be affected, depending on the nature of the start signals.

Figure 3:
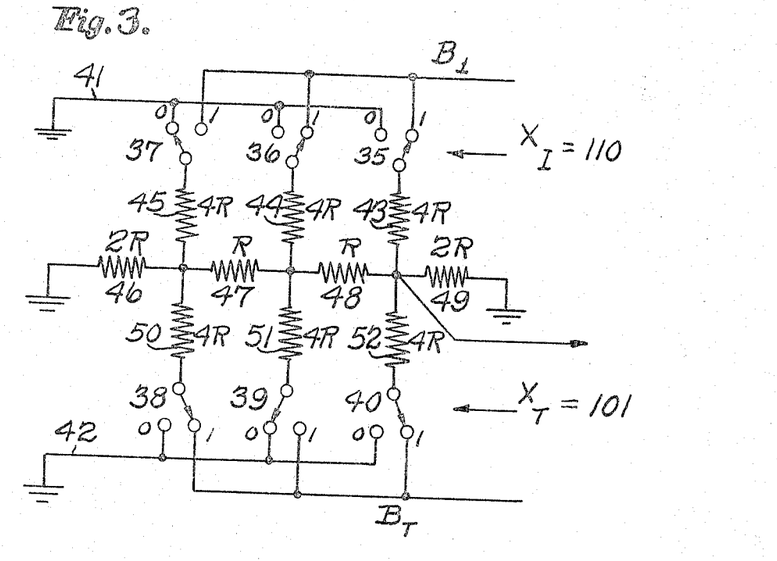
FIG. 3 is a unique digital-to-analog converter circuit used in the line generators of FIGS. 1 and 4.

FIG. 3 shows a digital-to-analog converter which may be used to replace converters 2 and 3, and summing circuit 16. In order to replace the various components which provide the Y deflection voltage, an additional converter as shown in FIG. 3 would be required. The following discussion is directed to the converter providing the X deflection voltage, it being understood that the Y converter works in an identical manner.

The converter contains a first plurality of two-position switches 35–37 and a second plurality of two-position switches 38–40. The right-hand terminal of each of switches 35–37 is connected directly to bus $B_I$ while the left-hand terminals of each switch are grounded through conductor 41. Similarly, the right-hand terminals of switches 38–40 are connected directly to bus $B_T$ while the left-hand terminals are grounded through conductor 42. The movable contacts of switches 35–37 are connected through resistances 43–45 respectively to a resistance chain consisting of resistances 46–49. The movable contacts of switches 38–40 are connected to resistance chain 46–49 through resistances 50–52 respectively. Resistances 45 and 50 are connected to the chain between resistances 46 and 47, resistances 44 and 51 are connected to the chain between resistances 47 and 48, and resistances 43 and 52 are connected to the chain between resistances 48 and 49. Resistances 46 and 49 are grounded at their other ends. The ohmic values of the various resistances in the converter are of the following ratio:

| Resistance: | Ohmic value |
| --- | --- |
| 47 | R |
| 48 | R |
| 46 | 2R |
| 49 | 2R |
| 43 | 4R |
| 44 | 4R |
| 45 | 4R |
| 50 | 4R |
| 51 | 4R |
| 52 | 4R |

In accordance with the logic employed in the circuit, the right-hand switch positions of switches 35–40 indicate a binary "1" and the left-hand switch positions indicate a binary "0." The $X_I$ register which comprises switches 35–37 may be utilized to store binary numbers consisting of three bits. Similarly, the $X_T$ register comprised of switches 38–40 is also capable of storing a binary number consisting of three bits. Three bit storage registers have been illustrated for the sake of clarity, but the same circuit may be readily modified to store any desired number of bits in its two registers. This would require merely that the resistance chain be extended and additional two-position switches provided. Although two-position switches are illustrated for clarity, it is to be understood that they may be replaced with other conventional binary storage devices such as vacuum tube or solid state flip-flop circuits without affecting the manner of operation of the converter. As stated before, transfer waveform generator 11 applies its output between bus $B_T$ and ground and generator 10 applies its output between bus $B_I$ and ground. The output voltage of the converter is derived across resistance 49. An examination of the circuit shows that the position of switches 35 and 40 determine the most significant digit in the binary numbers stored in the two registers while switches 37 and 38 determine the least significant digits in the stored binary numbers. Accordingly, register $X_I$ is seen to store the binary number 110 and register $X_T$ stores the binary number 101.

The circuit of FIG. 3 comprises two ladder networks, each of which converts the binary number stored in its register to an analog voltage upon the impression of a positive transfer waveform to its input. Since the two ladder type converters are connected node to node, the output voltage across resistor 49 is the analog of the sum of the two digital numbers stored in the two registers eliminating the need for a summing amplifier. By placing the address of the X coordinate of the initial point of a line in the $X_I$ register and of the terminal position in the $X_T$ register, the line may be drawn in the same manner as accomplished by the FIG. 1 embodiment with the use of converters 2 and 3 and summing network 16. Hence, the circuit may be referred to as a dual digital-to-analog converter (DDAC) as the single converter performs the summing function that was previously performed by two converters and the summing circuit.

It is noted that the circuit of FIG. 3 functions as a summing device when the busses $B_I$ and $B_T$ have a positive potential impressed thereupon. If, however, one of the busses was biased negatively and the other bus was biased positively, the device would function as a differencing device. As an example, if a positive voltage of magnitude E were impressed on bus $B_I$ and a voltage of equal magnitude and opposite polarity $-E$ were impressed on bus $B_T$, the voltage across load 49 would be the analog of the difference of the two digital numbers stored in registers $X_I$ and $X_T$. Hence, this circuit may be referred to as a differencing digital-to-analog converter (Diff. DAC).

In a DDAC, the $X_I$ register produces an output voltage $$E = \frac{E_I}{6}(X_T)$$

Thus, if a digital quantity is stored in one of the registers, the DDAC operates as a multiplier circuit because the output across the load is the product of the waveform $E_I$ and the stored quantity. As the waveform $E_I$ is varied, the output is the product of the instantaneous value of $E_I$ and the stored number. As discussed in connection with the operation of FIG. 1, the transfer waveforms applied to X component DDAC 53 (FIG. 4) are exact complements, thus $$E_I = E\left(1 - \frac{t}{T}\right) \text{ and } E_T = E\left(\frac{t}{T}\right)$$

Figure 4:
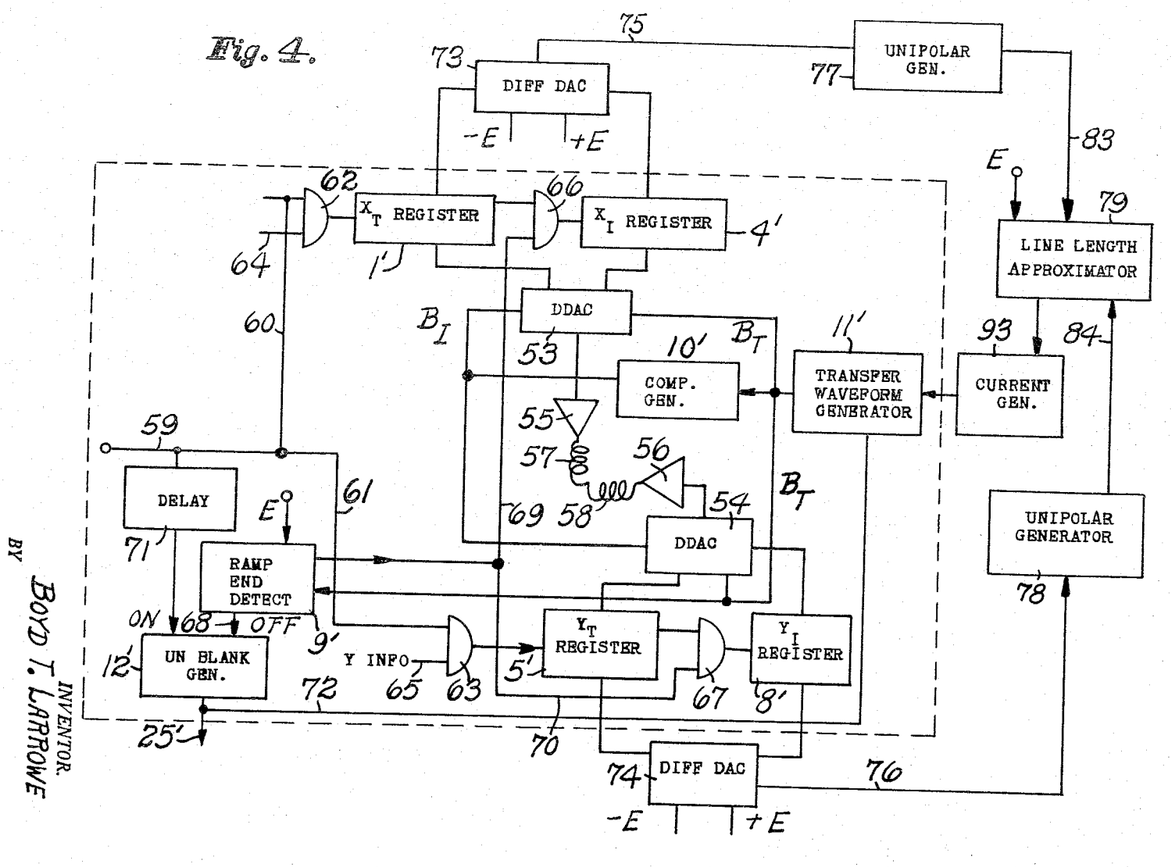
FIG. 4 is a block schematic diagram of a modified form of the line generator and showing in block form the preferred writing rate control system.

By superposition, the output voltage during time T is $$E_o = \frac{E}{6}\left(X_I + [X_T - X_I]\frac{t}{T}\right)$$

This, it is noted, is the equation for a linear transfer along the X axis from $X_I$ to $X_T$ in time T. Y component DDAC 54 operates in an identical manner and therefore need not be discussed.

Referring now to FIG. 4, the preferred embodiment of the invention is illustrated. The portion of the device enclosed within the dashed lines is a line generator which is substantially similar to that of FIG. 1. Registers 1', 4', 5', and 8' store the addresses of the initial and terminal points of the line to be traced in the same manner as the four registers of FIG. 1. Registers 1' and 4' are the registers of DDAC 53 and registers 5' and 8' are the registers of DDAC 54. The summed outputs of DDAC's 53 and 54 are applied to amplifiers 55 and 56 respectively and the outputs of the amplifiers to the control electrodes of the plotting device, here shown as deflection coils 57 and 58. Transfer waveform generator 11' generates the identical waveform as generator 11 of FIG. 1 and complementary generator 10' generates the complement of the waveform generated by generator 11'. The output of generator 11' is connected to the input of generator 10'. The output of generator 11' is connected by bus $B_T$ to one of the inputs of DDAC's 53 and 54 respectively. The output of complement generator 10' is connected by bus $B_I$ to the other input terminals of DDAC's 53 and 54 respectively.

This embodiment of the invention utilizes the "transfer" method to reset the four registers rather than the "return to zero" method described in connection with the operation of the FIG. 1 embodiment. In order to initiate the drawing of a particular line, an initiating pulse is impressed on conductor 59. This pulse is transmitted by conductors 60 and 61 to one of the terminals of AND gates 62 and 63. The other terminals 64 and 65 of AND gates 62 and 63 respectively are connected to the output of a digital computer or similar device which supplies the information to be stored in the four registers. Upon the reception of the initiating pulse, the AND gates 62 and 63 transmit the digital output of the computer to the registers 1' and 5', this output being the X and Y coordinates of the terminal point of the line to be drawn. During the same time period, in a manner to be discussed, the digital information which was stored in registers 1' and 5' is transferred to registers 4' and 8' through gates 66 and 67. Since the numbers stored in registers 1' and 5' was the address of the terminal point of the preceding line, it is also the address of the initial point of the next succeeding line.

The output of generator 11' is directly connected to ramp end detector 9'. When the output of generator 11' has reached a voltage equal to the reference level voltage E, the detector 9' transmits a pulse along conductors 69 and 70 in parallel to one of the input terminals of each of gates 66 and 67. This enables the number stored in registers 1' and 5' to be transferred to registers 4' and 8' during the time interval between line traces.

The sequential operation of the circuit enclosed within the dashed lines in tracing a straight line begins with the impression of an initiating pulse on conductor 59. This pulse is generated some time after the preceding line trace has been completed. This pulse is applied to one of the inputs of gates 62 and 63 causing the registers 1' and 5' together to receive and store the digital address of the terminal point of the line. Since generator 11' is at reference level E, ramp end detector 9' has already transmitted a pulse to AND gates 66 and 67 which caused the address of the terminal point of the preceding line to be transferred to registers 4' and 5'. At the same time detector 9' sent a pulse on line 68 to one input (the "off") terminal of unblank generator 12' which terminated the generation of the unblanking or Z axis pulse. From the time that the initiating pulse was transmitted along conductor 59 until the time the four registers were reset, the initiating pulse has been delayed by delay circuit 71. After a delay which is sufficient for the resetting operation to take place, the initiating pulse is transmitted to the other (the "on") input terminal of generator 12'. This pulse now turns on the unblanking generator and a Z pulse is transmitted to the unblanking electrode of the display device along conductor 25'. This Z pulse is also transmitted along conductor 72 to generator 11' causing the generation of another transfer waveform.

The circuits shown at FIG. 4 in block schematic form external to the dashed lines are utilized to change the basic line generator to a constant writing rate system. The transfer waveform generator 11' is basically a capacitive load for an adjustable amplitude, constant current source. In order to charge a capacitor C to a voltage E in a time T, a constant current $$I = \frac{EC}{T}$$

is required. Also, in a constant writing rate system $$T = \frac{S}{K}$$

By substitution $$I = \frac{ECK}{S} = \frac{K_1}{S}$$

Thus, for a constant writing rate system, the charging current required by the switch ramp generator is inversely proportional to the line length. The circuits external to the dashed lines, in a manner to be described, generate a charging current of the correct magnitude to provide a constant writing rate.

Diff. DAC 73, as discussed previously, is structurally identical to the converter of FIG. 3 and has stored in its $X_I$ and $X_T$ registers the same digital information as is stored in registers 1' and 4'. The bus $B_I$ has a voltage of $+E$ supplied thereto and bus $B_T$ has an equal voltage of opposite polarity $-E$ applied thereto. The output conductor 75 has therefore a voltage $\pm \Delta X$ (where $\Delta X = X_T - X_I$) impressed thereupon. The two digital registers storing the Y coordinates of the end points of the line are connected in an identical manner to Diff. DAC 74 and the output thereof $\pm \Delta Y = Y_T - Y_I$ is impressed upon conductor 76. The length of the traced line can be computed from the formula $S = \sqrt{\Delta X^2 + \Delta Y^2}$.

For any given line, $\Delta X$ and $\Delta Y$ may be either positive or negative. The line length approximator, to be described, required that the values be always positive. The circuits 77 and 78 serve to convert the output voltages of Diff. DAC's 73 and 74 respectively to a voltage of positive polarity; i.e., circuit 77 produces an output voltage which is always positive in polarity regardless of whether or not $\Delta X$ is positive or negative. This output voltage is applied by conductor 83 to one of the input terminals of line length approximator 79. Circuit 78, identical to circuit 77, produces a positive polarity output voltage regardless of the polarity of Y, this output voltage being applied to the other input terminal of approximator 79 by conductor 84.

Figure 6:
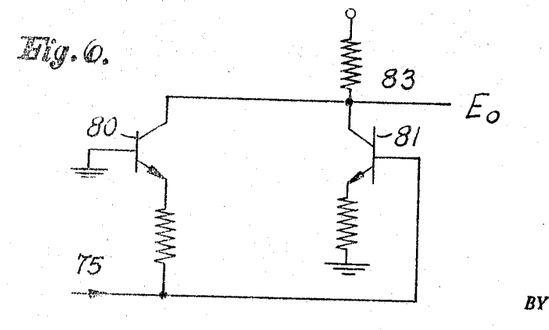
FIG. 6 is a schematic diagram of a converter circuit employed in the embodiment of the invention illustrated in FIG. 4 having a unipolar output for any polarity of input signal.

FIG. 6 illustrates a unipolar generator which produces this conversion of $\pm \Delta X$ and $\pm \Delta Y$ to positive values. Unipolar generator circuits are well-known and FIG. 6 indicates the mode of operation of one such circuit which could be used in the invention. The circuit comprises two transistors 80 and 81, each having an emitter, a collector, and a base electrode. Transistor 80 is an NPN type having its base grounded, its emitter connected to input 75 through a resistor and its collector connected to power supply $+E$ through a load resistor. Transistor 81, also an NPN type, has its emitter grounded through a resistor, its base directly connected to input 75 and its collector connected to the power supply through the load resistance. The output voltage of the circuit is impressed on conductor 83. The operation of the circuit will be described briefly with reference to a $\pm \Delta X$ input. If the input voltage $\Delta X$ applied to conductor 75 is zero, then both transistors 80 and 81 are cut off and no current flows through the load resistor. Therefore, in this case, $E_o = E$. If $\Delta X$ is positive, transistor 81 conducts and transistor 80 is cut off. Current flows through the load resistor, transistor 81 and the emitter resistance to ground, producing $E_o = 1 \Delta X 1$. If $\Delta X$ is negative, transistor 81 is cut off and transistor 80 conducts. Current flows, therefore, through the load resistor, transistor 80, and the emitter resistance also producing $E_o = 1 \Delta X 1$. It is observed that the output voltage $E_o$ is always positive.

Figure 7A:
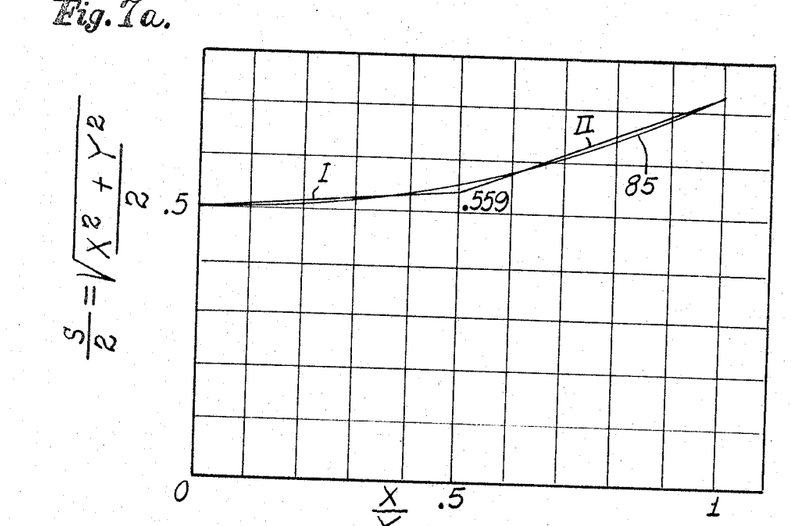
FIG. 7a is a graph of the output voltage of the line length approximator of FIG. 7b with respect to the potentials applied to its input terminals.

The line length approximator 79 has impressed on one of its input terminals a voltage $E_o = 1 \Delta X 1$ and on its other input tterminal a voltage $E_o = 1 \Delta Y 1$. It developes an output voltage S having a magnitude which is proportional to the length of the line to be drawn. Expressed in mathematical form, $S = \sqrt{X^2 + Y^2}$. Referring to FIG. 7a, the solution of $X = \sqrt{X^2 + Y^2}$ as the ratio $X/Y$ is varied from zero to unity with Y being held constant at the value one is shown as curve 85. Thus, if the approximator 79 produces an output voltage S corresponding to curve 85 as $X/Y$ is varied, this voltage S will be proportional to the length of the drawn line. The ordinate is scaled in units of $S/2$ rather than in units S merely for convenience in plotting. The approximator cannot, however, produce an output voltage which follows exactly curve 85 of FIG. 7a. Therefore, the approximator is made to produce an output which follows the two straight lines I and II of the graph, the two straight lines approximating the curve within $\pm 1.5\%$.

Figure 7B:
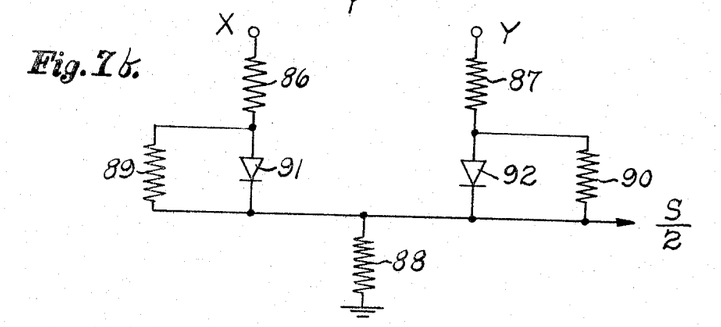
FIG. 7b is a schematic diagram of the line length approximator circuit which is used in the embodiment of the invention illustrated in FIG. 4.

FIG. 7b is a schematic diagram of the line length approximator used in the invention. The X voltage is applied between the X terminal and ground while the Y voltage is applied between the Y terminal and ground. Resistances 86, 87 and 88 are of approximately the same ohmic value and resistances 89 and 90 are of equal ohmic value but much larger than resistances 86–88. The slope of lines I and II and, therefore, the closeness with which the two lines approximate curve 85 is affacted by the magnitude of resistances 89 and 90.

Referring to FIGS. 7a and 7b together, the generation of the approximator circuit operates in the following manner. Assume the X potential is zero and Y is $+IV$, diode 92 conducts and diode 91 is cut off. Since resistor 87 is approximately equal in resistance to resistance 88, the voltage $S/2$ across load resistor 88 is 0.5 v., the voltage drop across the conducting diode being negligible. Referring again to FIG. 7a, it is seen that when the X terminal is at zero potential the ratio $X/Y$ is zero and the value of $$\frac{S}{2} = 0.5$$

As the X voltage is made more positive while the Y voltage is held constant at 1.0 v., the ratio of $X/Y$ increases. While the X potential is increasing to 0.5 v., this increasing voltage causes additional current to be drawn through 86, 89, and 88. This additional current due to the potential on the X terminal increases the voltage drop across load resistor 88. Referring to FIG. 7a, it is seen that as the X potential is increased from 0 to 0.5 v., the output voltage $S/2$ proportionally increases as evidenced by the slope of line I. The slope of line I is determined, as stated above, by the relative resistance of 89 to 86. If the resistance of resistor 89 is relatively large, more of the X potential is dropped across it and, accordingly, less is dropped across resistor 88. Thus, the voltage drop across the load is not as great and the slope of line I is slight. If resistor 89 were eliminated, there would not be a resistance shunting diode 91 and no current would flow in load resistance 88 due to the X potential when X had a value of $X<0.5$ v. In this case, the slope of line I would be zero. It is to be noted that for some applications, this zero slope of line I might be a sufficiently accurate approximation of the curve.

When the X potential reaches 0.5 v., diode 91 conducts because its anode is no longer more negative than the cathode. By the theorem of superposition, it can be seen that when diode 91 is conducting, the plot of $S/2$ versus $X/Y$ is a straight line having a slope of ⅓, shown as line II of FIG. 7a.

It is now seen that the approximator circuit generates an output voltage that is proportional to the length of the traced line; i.e., it produces an output voltage S, where $S = \sqrt{X^2 + Y^2}$ as $X/Y$ is varied from zero to unity. Also, the circuit is symmetrical with respect to X and Y; if X were held at 1.0 v. and the value of Y were varied between 0 and 1 v., the circuit would operate identically as described.

The approximator circuit of FIG. 7b could be readily modified to calculate the square root of terms containing more than two variables. For example, the value of S, where $S = \sqrt{X^2 + Y^2 + Z^2}$ can be calculated merely by adding an additional input Z connected to the ungrounded side of resistor 88 through a resistance and diode in series similar to the other input circuits.

The voltage S, proportional to the line length, which is generated by the approximator is subtracted from a reference voltage E. This may be done by conventional means which are not illustrated and produces an output from the approximator of $E_{APP}=E-\sqrt{X^2+Y^2}$.

Figure 8A:
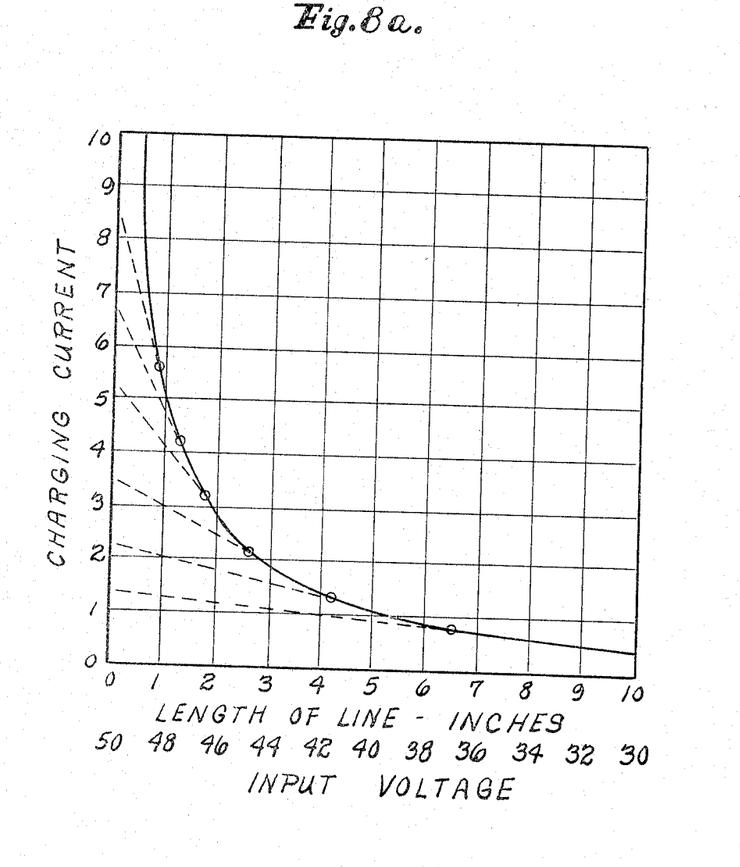
FIG. 8a is a graph illustrating the relation between the input voltage and the output current of the current generator of FIG. 4.

Current generator 93 receives as its input the voltage output of approximator 79. The relationship between input voltage, output current, and line length is shown by the graph of FIG. 8a. The curve of this graph shows that an increase in input voltage produces an increase in output current. Input voltage $E_{APP}=E-\sqrt{X^2+Y^2}$ is inversely proportional to line length because voltage S was subtracted from a reference level voltage E. Line length S is therefore inversely proportional to current output $$\left(I=\frac{K}{S}\right)$$

and this relation is shown by the hyperbolic curve. This current output of generator 93 is applied to generator 11' to produce a constant writing rate.

Figure 8B:
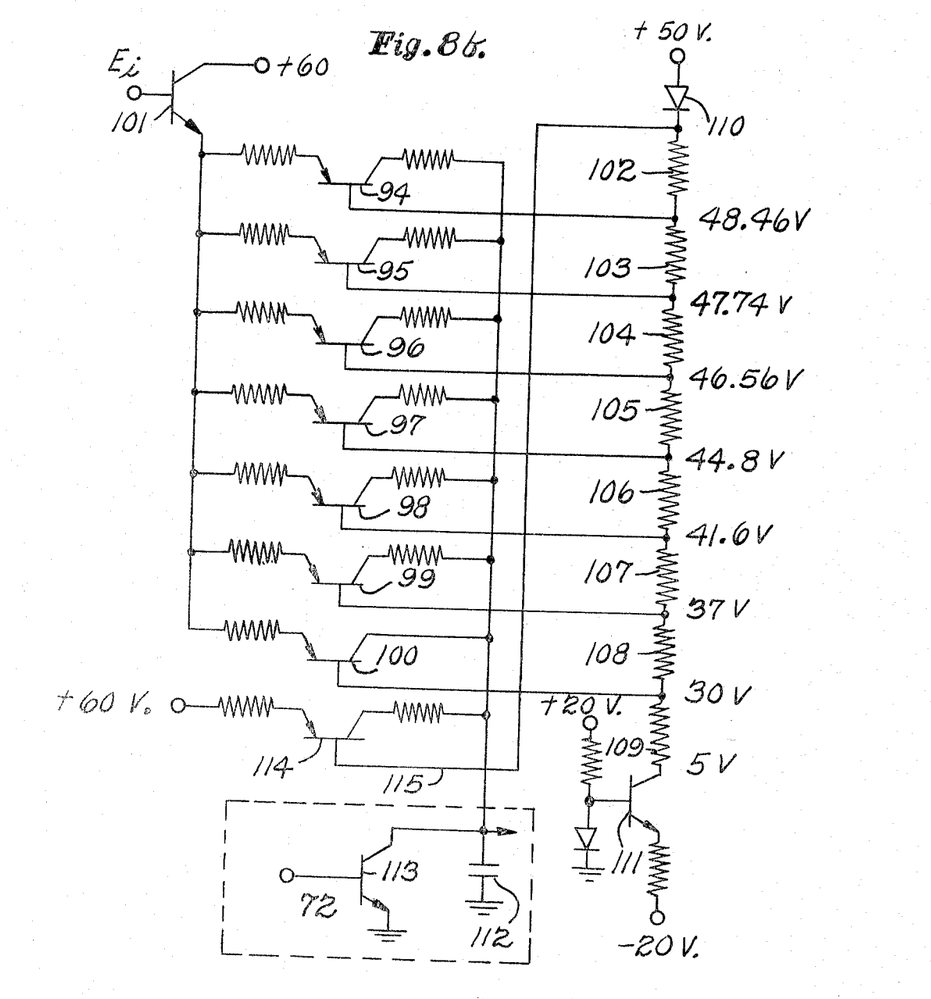
FIG. 8b is a schematic diagram of the current generator of FIG. 4. Also shown in the figure, enclosed in dashed lines, is a partial schematic diagram of the ramp generator which is used in the two described embodiments of the invention.

FIG. 8b is a schematic diagram of current generator 93. The figure also shows a partial schematic diagram of generator 11', enclosed in dashed lines, as the load connected to the output of the current generator. The operation of the current generator may best be understood by reference to FIGS. 8a and 8b together. Current generator 93 comprises seven transistors 94–100, all of which are connected through an emitter resistor to the emitter of transistor 101. Transistor 101 has its collector connected to a collector supply of +60 v. and its base connected to the output conductor of line length approximator 79. The current generator circuit also contains a string of biasing resistors 102–109 which are connected between the cathode of diode 110 and the collector of transistor 111. The anode of diode 110 is connected to a bias source of +50 v. The emitter of transistor 111 is connected through a resistor to a negative voltage supply. It is noted that during the entire operation of the line generator, transistor 111 conducts and produces the indicated voltages at the junctions between the resistors 102–109 of the resistance string. These junctions are directly connected to the bases of transistors 94–100.

If the input voltage of transistor 101 is less than the +60 v. bias on the collector some of the transistors 94–100 will conduct depending on the magnitude of the input voltage. For example, if the input voltage to transistor 101 were 45 v., then the transistors of 97–100 which had a base voltage of less than 45 v. would conduct and send current through capacitor 112 to ground. In this case, transistors 94–96 would not conduct as the base voltage on them is more positive than the emitter voltage. Transistor 114 has its emitter connected to a +60 v. source and its base connected to the +50 v. point on the resistance string by conductor 115. This transistor continually conducts and is used to determine the minimum current for the longest line of the system which could be traced.

The output of the circuit of FIG. 8b does not exactly follow the input voltage in the hyperbolic relationship expressed by the curve of FIG. 8a. Thus, the curve is approximated by selecting values of input voltage as biasing values for the bases of transistors 94–100. FIG. 8a shows six such values of input voltage. For example, suppose the input voltage an transistor 101 is 41.6 v., then transistors 98–100 are conducting and their current outputs are all flowing into capacitor 112. As the input voltage is increased to 44.8 v., the total output current increases linearly rather than hyperbolically. However, by the correct selection of bias voltage for the transistors producing the charging current output and by the proper selection of the number of such transistors, the current output may be made to approximate the hyperbola within a desired degree of accuracy.

Also shown in FIG. 8b, enclosed within dashed lines, is a partial schematic diagram of generator 11'. The voltage across the capacitor 112 is the ramp waveform which is applied to bus $B_T$. The ramp generator has been illustrated as a capacitor but it is to be understood that other well-known circuits which produce a more linear ramp voltage could be substituted.

Capacitor 112 is shunted by transistor 113. During the period when transistor 113 conducts, the current output of generator 93 is shunted around capacitor 112 and it cannot charge and produce a voltage output. The base of transistor 113 is connected to conductor 72, conductor 72 being connected to the output of unblank generator 12'. When the unblanking pulse is applied to the base electrode, transistor 113 is turned off and the ramp waveform is generated across capacitor 112. When the unblanking pulse is removed, transistor 113 is turned on and the capacitor is discharged in preparation for the generation of another ramp waveform.

While there has been shown and described the fundamental novel features of the invention as applied to a plurality of embodiments, it will be understood that various changes and additions may be made by those skilled in the art without departing from the spirit of the invention.

What is claimed is:

1. A device for drawing a straight line on a plotting surface comprising a plurality of pairs of converters, the converter pairs storing in digital notation the X and Y coordinates on said surface which define the initial and terminal points of the line, each converter storing a different one of the coordinates of one of the end points, means for causing the converters which store the X and Y coordinates of the initial point of the line to produce an output which decreases linearly from the analog of the stored digital quantities to zero in a predetermined time, means for simultaneously causing the converters which store the X and Y coordinates of the terminal point of the line to produce an output which increases linearly from zero to the analog of the stored digital quantities, means for summing the analog outputs from the converters which store the X coordinates, means for summing the analog outputs from the converters which store the Y coordinates, and means connected to said summing means and utilizing the outputs thereof to control the transfer of a drawing means along said plotting surface from said initial point to said terminal point.

2. A device for moving a drawing means along a predetermined path between two points, each point consisting of an intersection of an X and a Y coordinate, comprising a plurality of pairs of converters, each converter pair storing as digital quantities the coordinates of the two points, each converter storing a different one of the coordinates of one of the points, means for applying a first waveform having a positive slope to those of said converters in which the coordinates of the initial point are stored, means for applying a second waveform to those of said converters in which the coordinates of the terminal point are stored, said second waveform being the complement of said first waveform, said waveforms causing said converters to convert its stored digital quantity to an analog which varies proportionally as the waveform applied thereto, means for summing the analog quantities derived from those of said converters storing the X coordinates of the two said points, means for summing the analog quantities derived from those of said converters storing the Y coordinates of the two said points, and means connected to said summing means and utilizing the outputs thereof to direct the movement of said drawing means.

3. A device having a drawing means for drawing a straight line on a plotting surface between an initial and a terminal point, the points each being defined by the intersection of an X and a Y coordinate, comprising a plurality of converters having registers which store as digital quantities the coordinates of said points, each register storing a different one of the coordinates of one of the points, means for applying a first waveform to those of said plurality of converters in which the X and Y coordinates of the terminal point are stored, means for simultaneously applying a second waveform to those of said plurality of converters in which the X and Y coordinates of the initial point are stored, said first waveform being the complement of said second waveform, said waveforms causing said converters to convert the digital quantities stored in each register to an analog which is proportional to the instantaneous value of the waveform impressed upon that converter, means for summing the analog outputs of those converters in which the X coordinate of two points are stored, means for utilizing this summed analog output to control the transfer along the X axis of a drawing means, means for simultaneously summing the analog outputs of those converters in which the Y coordinates of the two points are stored, and means for utilizing this summed analog output to control the transfer of said drawing means along the Y axis of the plotting surface, said drawing means moving along the desired straight line as the result of the two simultaneously summed analog outputs.

4. In the device of claim 3, means controlling the waveform applying means for causing said drawing means to move at a constant rate.

5. A device for drawing a line between any two spaced points on the screen of a cathode ray tube, each point being defined by the intersection of an X and a Y coordinate, comprising a plurality of converters, each having a digital register, said registers storing the coordinates of the initial and terminal points of the line, each register storing a different one of the coordinates of one of the points, means for applying a first linear ramp voltage having a positive slope to those of said plurality of converters storing the coordinates of the terminal point of the line, means for simultaneously applying a second linear ramp voltage to those converters storing the coordinates of the terminal point of the line, said second ramp voltage being the complement of said first ramp voltage, said ramp voltages causing said converters to convert the digital quantity stored in each register to an analog voltage which varies proportionally as the waveform applied thereto, a first summing circuit for adding the analog outputs derived from the X registers, a second summing circuit for summing the analog outputs derived from the Y registers, means for applying the output of said first summing circuit to the X deflection electrode of the cathode ray tube, and means for simultaneously applying the output of said second summing circuit to the Y deflection electrode of the cathode ray tube, whereby the electron beam of the cathode ray tube is line controlled by the simultaneous application of X and Y deflection voltages to trace the desired line on the screen.

6. The device of claim 5 having means controlling the voltage applying means for causing the electron beam to draw lines of different lengths at a constant rate.

7. A device for drawing a straight line of any length on a plotting surface by the application of voltage to the X and Y deflection electrodes of the plotting device, the initial and terminal end points of the line being defined by the intersection of X and Y coordinates, comprising a plurality of converters, each having a digital register, input means for setting said registers so that each register stores in digital notation a different one of the coordinates of one of the end points of the line, means for applying a first waveform of a predetermined time duration to those converters of said plurality which store the X and Y coordinates of the initial point of the line, means for applying a second waveform to those other converters storing the X and Y coordinates of the terminal point of the line, said first waveform being a voltage of a linear ramp configuration of positive slope, said second waveform being the complement of said first waveform, said waveforms causing said stored quantities to be converted to a voltage which is the analog of the stored quantity and which varies proportionally as the instantaneous value of the applied waveform to that converter, first means for summing the analog outputs of said converters storing the X coordinates, second means for summing the analog outputs of said converters storing the Y coordinates, said first summing means being applied to the X deflection electrode and said second summing means being applied to the Y deflection electrode.

8. In the device of claim 7, means for controlling the voltage applying means for varying the time duration of said waveforms thereby causing the line to be drawn at a constant rate regardless of its length.

9. A device as recited in claim 7, wherein said input means resets said registers to store the coordinates of end points of another line upon the completion of the drawing of the preceding line.

10. In the device as recited in claim 9, a blanking means responsive to said input means and said waveform applying means which unblanks said plotting device during the time in which a line is being drawn and blanks said plotting device during the time interval in which said registers are being reset.

11. A digital-to-analog converter comprising a chain of impedances, a first register for storing a first quantity in digital notation being electrically coupled to said impedance chain at points between adjacent impedances, a second register for storing a second quantity in digital notation being electrically coupled to said impedance chain at points between adjacent impedances, means for applying a first waveform to said first register whereby said converter produces a first output which is the analog of the first stored quantity, said first output varying proportionally as said first waveform, means for applying a second waveform to said second register whereby said converter produces a second output which is the analog of the second stored quantity, said second output varying proportionally as said second waveform, and a load resistance electrically coupled to said registers for summing the two outputs whereby the voltage developed across said load resistance is the analog of the sum of the two stored quantities.

12. A digital-to-analog converter comprising a chain of impedances, a first register for storing a first quantity in digital notation, the stages of which being electrically connected to the impedance chain at points between adjacent impedances, a second register for storing a second quantity in digital notation, the stages of which being electrically connected to the impedance chain at points between adjacent impedances, means for applying a first voltage waveform to said first register, means for applying a second voltage waveform to said second register, said first waveform having a ramp configuration with a positive slope, said second waveform being the complement of said first waveform, means for developing a first output from said converter and for developing a second output from said converter which is the analog of said first and second quantities and which varies proportionally as said first and second waveforms, respectively, and means for summing said outputs to produce a varying output which is the analog of the instantaneous sum of the two stored quantities.

13. A digital-to-analog converter as described in claim 12 in which the outputs of the two registers are impressed upon said chain of impedances having both its ends grounded, the summed output being developed across that resistance of said chain which has one end electrically connected to the register stages representing the most significant digits of the two stored quantities and its other end grounded.

14. A digital-to-analog converter as described in claim 13 in which the output terminals of the stages of each of said registers are electrically connected to the resistance chain through resistors each having substantially double the resistance of the end resistances of said chain.

15. A digital-to-analog converter comprising a chain of impedances, a first register for storing a first digital number, the stages of which being electrically connected to the impedance chain at points between adjacent impedances, a second register for storing a second digital number, the stages of which being electrically connected to the impedance chain at points between adjacent impedances, means for applying a first waveform to said first register, means for applying a second waveform to said second register, said second waveform being equal in magnitude but opposite in polarity to said first waveform, means for developing a first output from said converter and for developing a second output from said converter which is the analog of said first and second numbers, respectively and means electrically coupled to said registers for combining said analog outputs to produce a summed output which is the analog of the difference of the two said numbers.

16. In a device for controlling movement along a straight line between two spaced points at a constant rate regardless of the distance between the two points, a generator producing a voltage waveform, the time duration of said waveform controlling the rate of movement, first means producing a voltage inversely proportional to the length of the line, and second means receiving said voltage and generating a charging current which is inversely proportional to the line length, said charging current controlling the time duration of said voltage waveform generator thereby providing a constant rate of movement.

17. The device of claim 16 in which the voltage waveform generator comprises a capacitor which is charged to a reference voltage by said charging current, said waveform being the voltage developed across said capacitor.

18. A current generator comprising a plurality of controllable conduction devices each having two main current carrying terminals and a control terminal, all of said conduction devices being connected in parallel between a common input terminal and a common output terminal with like ones of said main current carrying terminals connected together, series connected biasing means electrically coupled to the conduction device control terminals to bias each of said conduction devices to a different threshold of conduction whereby the output current is proportional to the voltage applied to said input terminal.

19. The device of claim 18 in which said biasing means comprises a series-connected resistance string connected across a bias source, the control terminal of each of said conduction devices being connected to said resistance string at a different point so as to provide a different threshold of conduction for each of said conduction devices.

20. A line length approximator comprising a plurality of input terminals, a load resistor having one end grounded, each of said input terminals being connected to the ungrounded end of said load resistor through a resistance and a diode in series, whereby the voltage impressed upon each of said input terminals is proportionally divided between the associated resistance and said load resistor, each diode being poled in the current conductive direction between said input terminal and said load resistor, and a resistance in shunt with each of said diodes, the resistance of said shunt resistances being much greater than the resistance of said load resistor.

21. The device of claim 20 wherein the connecting resistances are each nominally equal in value to the load resistor whereby the voltage impressed upon each of said input terminals is substantially equally divided between the associated resistance and said load resistor.

22. The line length approximator of claim 21 wherein the shunt resistances are substantially equal in value.

23. A line length approximator comprising a plurality of input terminals for receiving coordinate input voltage signals for generating an output signal representative of a curve segment, a load resistor having one end grounded, an output terminal electrically coupled to the ungrounded end of the load resistor, said input terminals being electrically connected to the ungrounded end of said load resistor through nominally equal resistances and diodes connected in series, whereby the voltage impressed upon each of said input terminals is proportionally divided between its associated resistance and said load resistor, each diode being poled in the current conductive direction between the associated input terminal and said load resistor.

24. The device of claim 23 wherein the connecting resistances are each nominally equal in value to the load resistor whereby the voltage impressed upon each of said input terminals is substantially equally divided between the associated resistance and said load resistor.

25. The device of claim 16 wherein the first means producing a voltage inversely proportional to the length of the line is comprised of a plurality of input terminals for receiving input voltage signals, a load resistor having one end grounded, said input terminals being electrically connected to the ungrounded end of said load resistor through substantially equal resistances and diodes connected in series, whereby the voltage impressed upon each of said input terminals is proportionally divided between its associated resistance and said load resistor, each diode being poled in the current conductive direction between the associated input terminal and said load resistor, and inversion means coupled to the grounded end of said load resistor for subtracting the output voltage thereof from a reference voltage.

26. The device of claim 16 wherein the charging current generator is comprised of a plurality of controllable conduction devices each having two main current carrying terminals and a control terminal, all of said conduction devices being connected in parallel with a common input and a common output terminal, series-connected resistance biasing means electrically coupled to bias each of said conduction devices to a different threshold of conduction whereby the output current is proportional to the voltage applied to said input terminal.

References Cited by the Examiner

UNITED STATES PATENTS

| | | |
|---|---|---|
| 2,581,124 | 1/1952 | Moe. |
| 2,927,735 | 3/1960 | Scuitto _________ 235—151.11 X |
| 2,982,473 | 5/1961 | Goertzel ___________ 235—197 |
| 3,030,619 | 4/1962 | Ostrov et al. ______ 340—347.1 |
| 3,099,777 | 7/1963 | Davis _________ 235—151.11 X |
| 3,109,092 | 10/1963 | Lott et al. ______ 235—151.11 X |
| 3,119,012 | 1/1964 | Sherman ___________ 235—197 |
| 3,131,298 | 4/1964 | Creusere _________ 235—197 X |
| 3,183,342 | 5/1965 | Wortzman ______ 235—150.5 X |
| 3,217,219 | 11/1965 | Muldoon. |
| 3,222,507 | 12/1965 | Campanella et al. __ 235—150 X |

MALCOLM A. MORRISON, *Primary Examiner.*

K. W. DOBYNS, M. P. HARTMAN,
*Assistant Examiners.*